E. P. BENSON.
COMBINED BLANK CHECK AND PAID VOUCHER HOLDER.
APPLICATION FILED MAR. 2, 1918.
1,271,998.
Patented July 9, 1918.
4 SHEETS—SHEET 1.
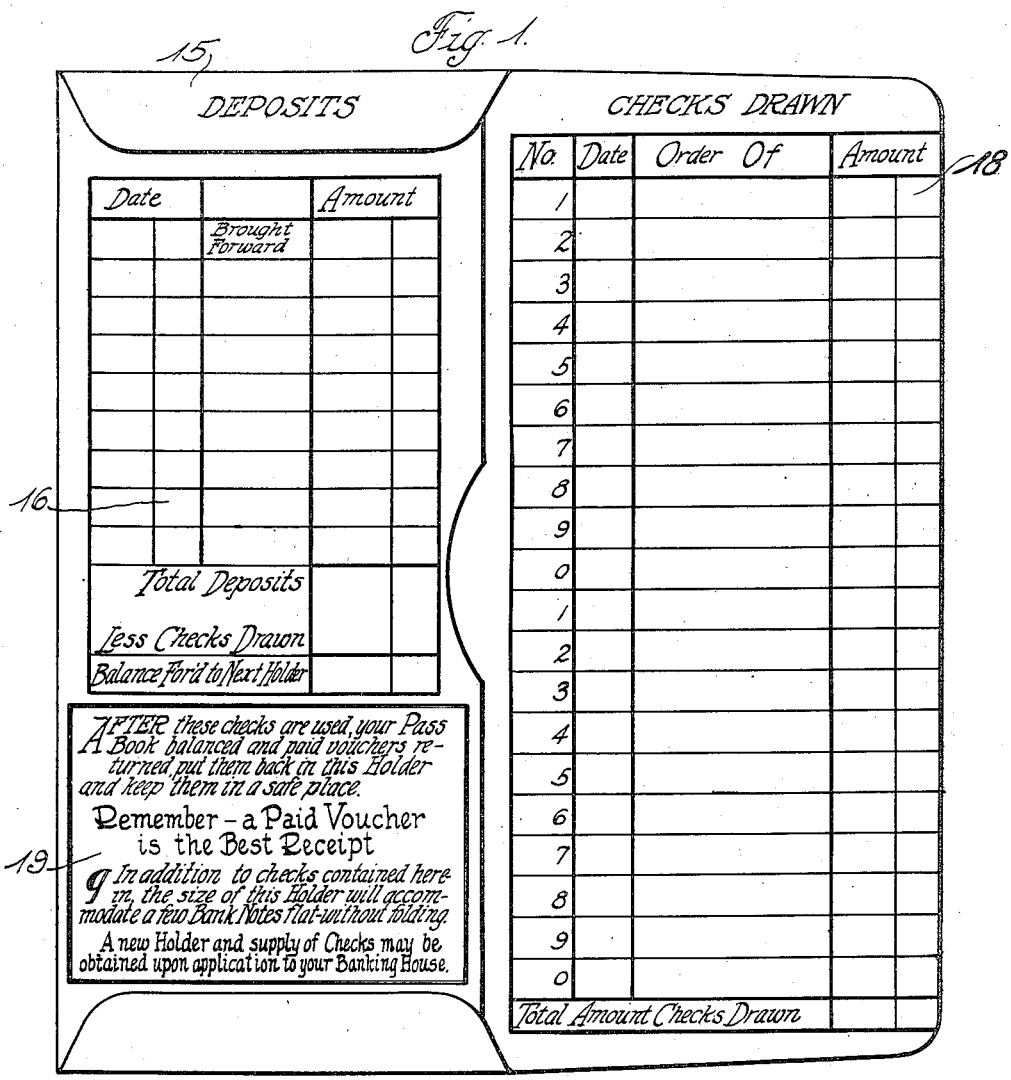

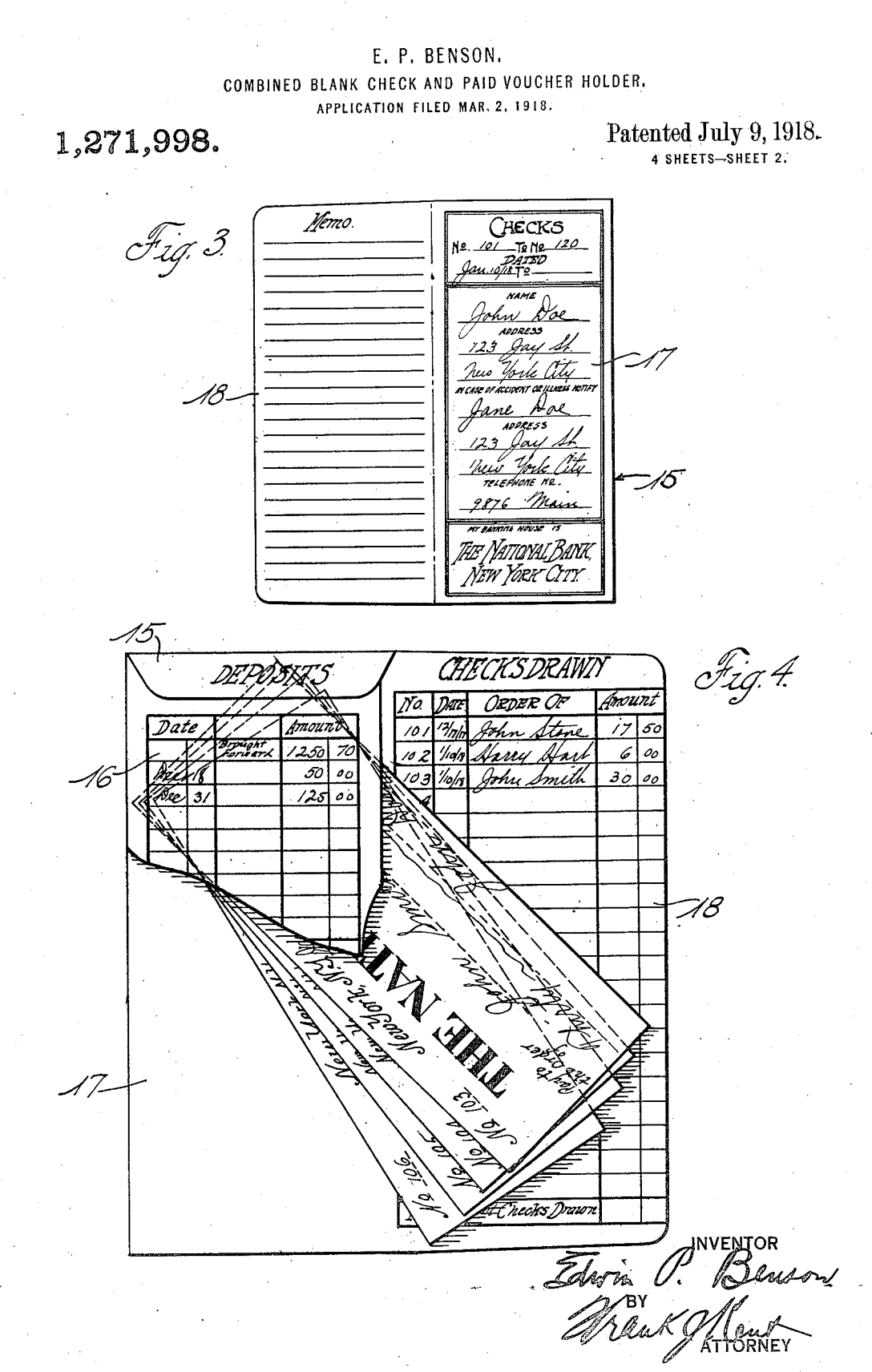

E. P. BENSON.
COMBINED BLANK CHECK AND PAID VOUCHER HOLDER.
APPLICATION FILED MAR. 2, 1918.

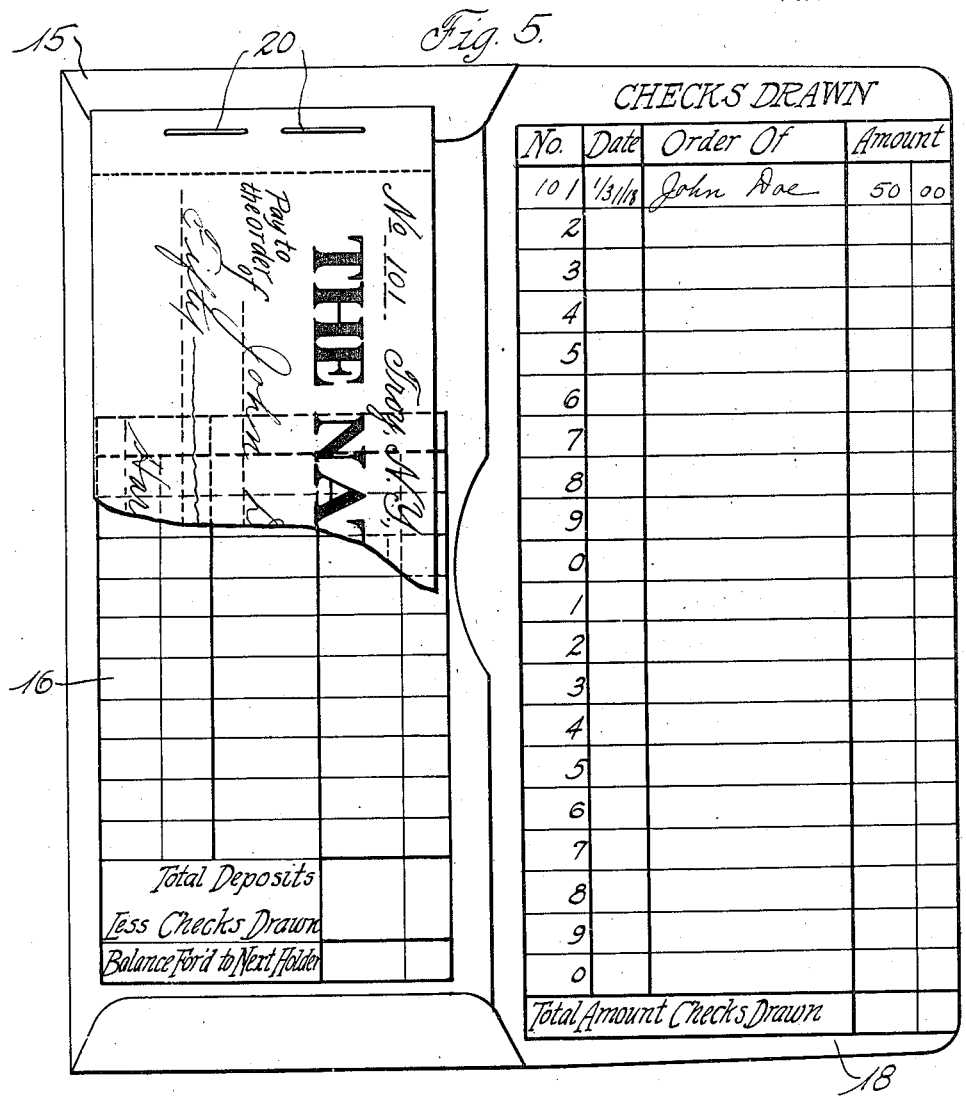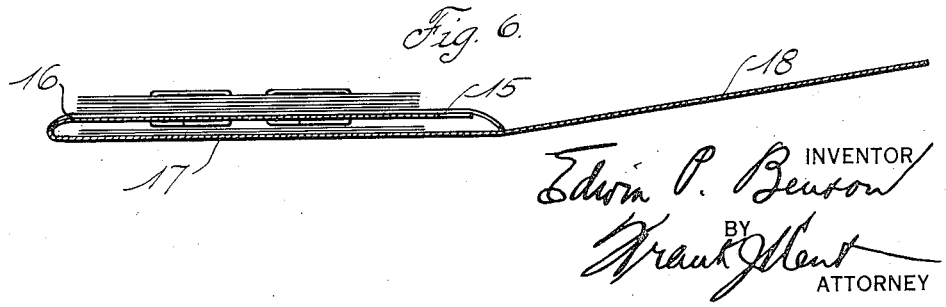

E. P. BENSON.
COMBINED BLANK CHECK AND PAID VOUCHER HOLDER.
APPLICATION FILED MAR. 2, 1918.
Patented July 9, 1918.
4 SHEETS—SHEET 4.
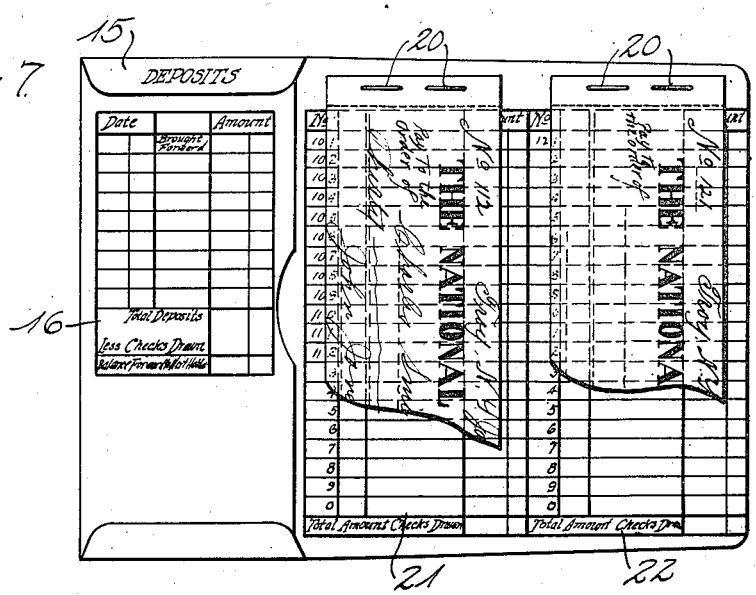
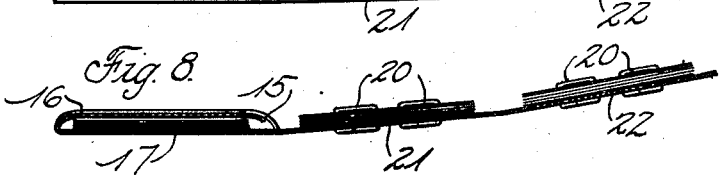
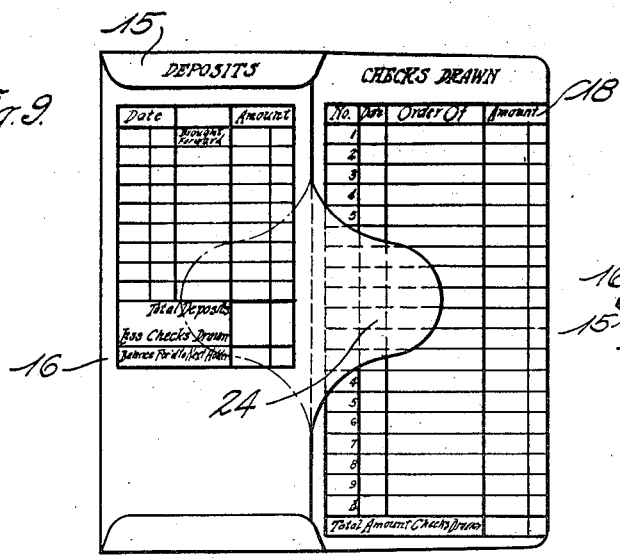
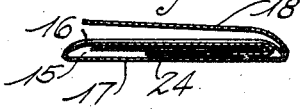
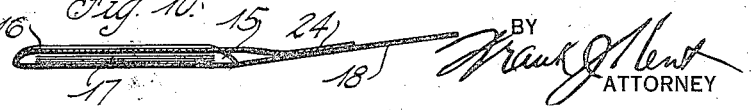

UNITED STATES PATENT OFFICE.

EDWIN P. BENSON, OF NEW YORK, N. Y.

COMBINED BLANK-CHECK AND PAID-VOUCHER HOLDER.

1,271,998.

Specification of Letters Patent.  Patented July 9, 1918.

Application filed March 2, 1918. Serial No. 219,944.

*To all whom it may concern:*

Be it known that I, EDWIN P. BENSON, a citizen of the United States, residing at New York, in the county of New York and State of New York, have invented certain new and useful Improvements in Combined Blank-Check and Paid-Voucher Holders, of which the following is a specification.

This invention relates to a combined blank check and paid voucher holder and is designed to be used instead of the ordinary "pocket" check-book generally furnished by banking institutions to small depositors. These pocket check-books are comparatively expensive, because the manufacture of them involves wire stitching or binding, the use of comparatively heavy and therefore costly covers, which are usually made in imitation of leather. Furthermore, the manufacture of these pocket check-books involves a certain waste of the paper on which the checks themselves are printed or lithographed, and the article is bulky, inconvenient to handle particularly when one is writing checks and when one attempts to make corresponding entries on the stubs. The result is that these pocket check-books are a waste and an expense to the banking institution and they are very often lost, mislaid or thrown away before all of the blank checks have been used.

It is the object of my invention to provide a substitute for this unsatisfactory pocket check-book which eliminates all of the disadvantages above referred to, and particularly which does away with binding and the consequent expense and bulk.

Another object in connection with such substitute is to provide for the carrying of blank checks or paid vouchers in compact form, readily accessible for all purposes and in which adequate provision is made for making permanent records of all items of interest pertaining to such checks as they are filled out.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as part of this specification, and in which I have shown a merely preferred form of embodiment of the invention, Figure 1 is a plan view of a holder employed in connection with my invention, showing the back of the envelop and the inner face of the flap; Fig. 2 is a sectional view taken on the line 2—2 of Fig. 1; Fig. 3 is a view similar to Fig. 1, but showing the other side of the envelop and flap; Fig. 4 is a view similar to Fig. 1 on a smaller scale, with part of the envelop back torn away showing the relation of the contained checks to the holder and illustrating how the record of deposits and checks drawn may be kept; Fig. 5 is a view similar to Fig. 1, illustrating a modification; Fig. 6 is a sectional view taken on the line 6—6 of Fig. 5; Fig. 7 is a view similar to Fig. 5 but on a smaller scale and illustrating a further modification; Fig. 8 is a sectional view taken on the line 8—8 of Fig. 7; Fig. 9 is a view similar to Fig. 1 showing an attachment for more securely retaining the contents of the holder in position; Fig. 10 is a sectional view on the line 10—10 of Fig. 9; and Fig. 11 is a view similar to Fig. 10, but showing the parts when the holder is closed.

Referring to the numerals on the drawings, there is shown at 15 an envelop which may be made up of any usual or preferred material and in any desired manner, provided with a back 16 and a front face 17, and a flap 18. This envelop is made of a size to accommodate the size checks which are to be used with it. On the back face 16 of the envelop are provided rulings and indicia for the keeping of a record of deposits made. On the inner face of the envelop flap (Fig. 1) are provided rulings and indicia upon which the customer may keep a record of the numbers, amounts, etc., of the checks contained in the holder, as he issues them from time to time. The number of checks placed in the holder initially will correspond with the number of horizontal record spaces on the inner face of the flap 18, twenty being shown in the example Fig. 1. The blank checks initially placed in the holder may be numbered to correspond with the numberings of the horizontal record spaces on the inner face of the flap before the holder and its contained checks is given to the customer, or it may be left to the customer to number the checks to correspond with such record spaces. In addition to the provision of the spaces and markings for record of deposits made on the back 16 of the envelop, this back face may also contain a legend indicated at 19 comprising directions for using the holder and contents, etc.

The front face of the envelop (Fig. 3) contains rulings and indicia upon which the customer may make a record of the numbers of the checks contained within the holder, the dates between which the contained checks are issued, his name, address and other particulars, and also if desired the name of the issuing bank. The outer face of the flap, as shown in Fig. 3, may be ruled for general memoranda.

Fig. 4 illustrates how the records of deposits and checks drawn may be kept, and also shows how paid checks may be kept in the holder. In Fig. 5 is shown a modification of the form of device shown in Fig. 1, to the extent that instead of inserting the blank checks within the pocket of the envelop, they are fastened to the back face of the envelop as by means of wire stitching 20. In this form of device the checks are torn off one by one as they are written and when they are returned they are placed inside the pocket just as with the Fig. 1 form of device, Fig. 6 illustrating some of the unissued checks as well as some of the paid vouchers inside the pocket.

In Fig. 7 there is illustrated a further modification, in which the flap of the envelop has a double fold 21—22, and on the inner face of each of these folds a number of blank checks may be secured as by wire stitching 20, this form being employed for instance where it is desired to provide for a larger number of checks. The faces of the flap folds underneath the blank checks will be provided with rulings and markings for records of the checks as issued, the same as in connection with the Fig. 1 form.

In Figs. 9, 10 and 11 I illustrate a modification of the form of device shown in Fig. 1. Here the inner edge of the back face of the envelop is provided with a tab 24, which is adapted to be turned in underneath the checks contained within the envelop pocket, as shown in dotted lines in Fig. 9 and in section in Fig. 11, thus preventing the accidental dropping of checks from the envelop pocket.

It will be evident that the arrangement described has many advantages. For instance, when the checks have been all issued and paid they may be kept in the holder, the holder and its contents being filed away. The record on each holder will apply directly to the checks contained therein. With the use of this system the bank will have to give away fewer blank checks at a time, and these will be cheaper because of the saving of material, binding, etc. Fewer blank checks being given away at a time results in the customer coming or sending to the bank for a new supply more often, which affords an opportunity to the bank for balancing the account with greater frequency. The checks being placed in the holder unbound, the expense of perforating, collating and wire stitching into the ordinary permanent cover is done away with. The device is handy to carry, convenient, compact, the size of the checks may be larger without the use of more material, because the material ordinarily employed for the stubs is saved, furnishes its own identification of the customer and affords a means for storing paid vouchers.

It will be apparent that in addition to the consecutive numbering of the checks, each bunch of the checks, and the holder itself may have the same number printed on it somewhere; so that the bank by making a note of the number of the holder at the time it is given to the customer will be able to keep track of the checks given to the customer in that particular holder, thereby assisting to prevent fraud, &c.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

I claim:

1. A device of the kind described including an envelop provided with a flap, a plurality of checks loosely contained within the envelop, indicia upon the front face of the envelop for the keeping of a record to identify the owner of the envelop, and indicia upon the back of the envelop and the inner face of the flap for the making of records of bank deposits and of checks issued, the indicia for the records of checks issued corresponding with the number of checks contained in the envelop.

2. A device of the kind described including an envelop provided with a flap, a plurality of checks loosely contained within the envelop, indicia upon the front face of the envelop for the keeping of a record to identify the owner of the envelop, and indicia upon the back of the envelop and the inner face of the flap for the making of records of bank deposits and checks issued, the indicia for the records of checks issued corresponding with the number of checks contained in the envelop, and means independent of the envelop flap for keeping the checks within the envelop.

3. A device of the kind described including an envelop provided with a flap, a plurality of checks loosely contained within the envelop, indicia upon the front face of the envelop for the keeping of a record to identify the owner of the envelop, and indicia upon the back of the envelop and the inner face of the flap for the making of records of bank deposits and checks issued, the indicia for the records of checks issued corresponding with the number of checks contained in the envelop, the envelop and the contained checks bearing an identical symbol.

4. A device of the kind described including an envelop provided with a flap, the back face of the envelop having secured thereto a plurality of blank checks and provided underneath said checks with indicia for making a record pertaining to bank deposits made, the inner face of the flap provided with indicia for making a record of checks issued corresponding in number with the number of checks initially carried by the envelop, and the outside of the envelop carrying indicia for making a record to identify the owner of the envelop, the checks when paid adapted to be inserted within the envelop for permanent safekeeping.

In testimony whereof I affix my signature.

EDWIN P. BENSON.